United States Patent
Thompson

(10) Patent No.: US 8,789,494 B2
(45) Date of Patent: Jul. 29, 2014

(54) DETECTION APPARATUS FOR THE MONITORING OF MILKING ANIMALS

(75) Inventor: William Stanley Thompson, Queenstown (NZ)

(73) Assignee: Smart Farm Technologies Limited, Hamilton (NZ)

( * ) Notice: Subject to any disclaimer, the term of this patent is extended or adjusted under 35 U.S.C. 154(b) by 0 days.

(21) Appl. No.: 13/992,270

(22) PCT Filed: Dec. 6, 2011

(86) PCT No.: PCT/NZ2011/000253
§ 371 (c)(1),
(2), (4) Date: Aug. 19, 2013

(87) PCT Pub. No.: WO2012/078054
PCT Pub. Date: Jun. 14, 2012

(65) Prior Publication Data
US 2013/0319336 A1     Dec. 5, 2013

(30) Foreign Application Priority Data
Dec. 9, 2010 (NZ) .......................... 589815

(51) Int. Cl.
*A01J 5/007* (2006.01)

(52) U.S. Cl.
USPC .................... 119/14.02; 119/14.14

(58) Field of Classification Search
USPC ................. 119/14.02, 14.14, 14.18
See application file for complete search history.

(56) References Cited

U.S. PATENT DOCUMENTS

| | | | |
|---|---|---|---|
| 4,532,892 A | 8/1985 | Kuzara | |
| 4,593,649 A * | 6/1986 | Britten | 119/14.08 |
| 5,474,085 A | 12/1995 | Hurnik et al. | |
| 5,873,323 A | 2/1999 | van den Berg et al. | |
| 5,979,359 A * | 11/1999 | Hansson | 119/14.08 |
| 5,996,529 A | 12/1999 | Sissom et al. | |
| 6,805,074 B2 * | 10/2004 | Newcomb et al. | 119/51.01 |
| 6,814,025 B2 | 11/2004 | Chen et al. | |
| 6,938,576 B2 | 9/2005 | van der Lely et al. | |

(Continued)

FOREIGN PATENT DOCUMENTS

| | | |
|---|---|---|
| WO | 00057163 | 9/2000 |
| WO | 00057164 | 9/2000 |
| WO | 2005101273 | 10/2005 |

OTHER PUBLICATIONS

Hurnik et al., "An Investigation of Skin Temperature Differentials in Relation to Estrus in Dairy Cattle Using a Thermal Infrared Scanning Tchnique", J. Anim. Sci., vol. 61, 1985, pp. 1095-1102.

(Continued)

*Primary Examiner* — Yvonne Abbott
(74) *Attorney, Agent, or Firm* — Greer, Burns & Crain, Ltd.

(57) ABSTRACT

An apparatus is provided for monitoring a milking animal during milking of the animal. The apparatus includes a number of productivity sensors, each measuring at least one indicator of productivity of the animal. A number of temperature sensors, including at least two thermographic cameras, measure heat output from different processing areas of the milking animal. A processor receives the heat outputs and productivity indicators, and uses a combination of these to determine a condition of the milking animal. The condition is then indicated in real time at the monitoring apparatus.

18 Claims, 3 Drawing Sheets

(56) References Cited

U.S. PATENT DOCUMENTS

| | | | |
|---|---|---|---|
| 7,039,220 B2* | 5/2006 | Kriesel | 382/110 |
| 7,277,744 B2 | 10/2007 | Schaefer et al. | |
| 7,340,293 B2 | 3/2008 | McQuilkin | |
| 8,297,231 B2* | 10/2012 | Yanai et al. | 119/174 |
| 2003/0065480 A1 | 4/2003 | Vijverberg et al. | |

OTHER PUBLICATIONS

Coppola et al., "Using Body Surface Temperature to Predict Calving", Proceedings, Western Section, American Society of Animal Science, vol. 53, 2002.

Moallem et al., "Graphic Monitoring of the Course of Some Clinical Conditions in Diary Cows Using a Computerized Dairy Management System", Israel Journal of Veternary Medicine, vol. 57, No. 2, 2002, pp. 43-64.

Montanholi, "Investigations on Biological Indicators for Feed Efficiency in Cattle" Thesis, 2009.

Montanholi et al., "On the Determination of Residual Feed Intake and Associations of Infrared Thermography with Efficiency and Ultrasound Traits in Beef Bulls" Livestock Science, vol. 125, No. 1, Oct. 2009, pp. 22-30.

\* cited by examiner

DETECTION APPARATUS FOR THE MONITORING OF MILKING ANIMALS

STATEMENT OF CORRESPONDING APPLICATIONS

This application is based on the Provisional specification filed in relation to New Zealand Patent Application Number 589815, the entire contents of which are incorporated herein by reference.

TECHNICAL FIELD

This invention relates to a detection apparatus.

In particular, the present invention relates to detection of conditions in a milking animal such as a cow.

BACKGROUND ART

It is important for a number of reasons that a farmer must be able to determine the condition of their animals.

These reasons include:
being able to ensure that an animal is in optimum condition for optimal milk production, and
knowing the general wellbeing of the animal, and
knowing when to treat animals for various conditions, such as mastitis and heat stroke, and
oestrus onset.

At present, these conditions can be determined by a number of ways, many of which are time consuming, labour intensive or inaccurate.

Reference will be made throughout the specification to the milking animal being a cow. However, it should be appreciated that the present invention could apply to other milking animals such as goats and sheep.

One of the conditions for which farmers are highly incentivised to diagnose and treat is mastitis. Early identification and treatment of sub-clinical mastitis can result in the infection period being greatly reduced. This in turn increases the productivity of the cow, as milk obtained from a mastitic animal is often dumped in order to maintain the quality of the milk to be collected.

There are numerous techniques for detecting mastitis—particularly using electrical conductivity. Udder temperature has also been identified as a potential indicator of mastitis. U.S. Pat. No. 7,277,744 describes one technique utilising infrared imaging of a cow's udder to identify inflammation associated with the onset of mastitis.

Infrared thermography has also been used to predict the onset of lameness by detecting inflammation in extremities, which is characterised by an increase in temperature. To date, the use of thermography to detect inflammation is labour intensive, requiring the capture of a thermographic image for each hoof and subsequent interpretation of the image by a skilled person. In a farming situation, workers are generally responsible for a range of tasks and the retention of a highly specialised technician is not cost efficient.

The dairy industry is also highly dependent on the oestrous cycle of a cow. Most modern farming techniques use artificial insemination of a cow to increase the value of bloodlines. This is a skilled procedure usually requiring a trained technician to visit the farm with multiple straws of semen stored in liquid nitrogen. The timing of when the cow is inseminated is critical. If the semen is administered at the wrong time of the cow's oestrous cycle, then a successful conception will not occur as it takes some time to determine whether a cow has been successfully inseminated, and considerable time can be wasted before the cow is inseminated again.

Another disadvantage of unsuccessful attempts at insemination is that multiple visits from the technician are required, which can be expensive—both in terms of the technician's time and the wasted semen.

Numerous attempts have been made to develop an accurate method for determining the onset of oestrus in cows.

Most commonly, these methods involve the detection of mounting by other cows—either by marking or detection of irritation. Other methods include the use of pedometers, or measuring the electrical resistance of reproductive tract secretions.

Experienced farmers and veterinarians can sometimes predict if a cow goes into oestrous through detecting a rise in skin temperature. It is known that during oestrous the cow's blood vessels dilate which should increase blood flow to the skin making it warmer and hence closer to core temperature than normal. It is also known that there can be a small (<0.5° C.) rise in core temperature as the cow goes into oestrous as well. However due to time intensive farming practices or the use of automated milking machines which milk cows through an entire 24 hour day, it is highly impractical for the farmer to consistently determine oestrous in this manner.

Techniques have been developed for measuring increases in temperature of the sexual organs of an animal, or using temperature to indicate rubbing from mounting in order to predict the onset of oestrus.

Although temperature measurements have been used to determine health related conditions in isolation, there remains a need for non-invasive detection of these conditions—preferably in an integrated system.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to one aspect of the present invention there is provided an apparatus for monitoring a milking animal during milking of the animal, including
a plurality of productivity sensors, each configured to measure at least one indicator of productivity of the animal and output a signal indicative of same;
a plurality of temperature sensors, each sensor configured to measure an indicator of heat output from different processing areas of the milking animal and output a signal indicative of same, wherein at least two of the temperature sensors are thermographic cameras; and
a processor configured to:
receive the signals indicative of heat output;
receive the signals indicative of the productivity indicators, and
use a combination of the heat output and productivity indicators to determine at least one condition of the milking animal, and cause that condition to be indicated in real time at the monitoring apparatus.

According to another aspect of the present invention there is provided a method of monitoring a milking animal, using a monitoring apparatus, during milking of the animal, the method including the steps of:
i) measuring, with each sensor of a plurality of temperature sensors positioned relative to the milking animal such that each sensor is directed to a different processing area, an indicator of heat output from each respective processing area, wherein at least two of the temperature sensors are thermographic cameras, each configured to obtain a thermographic image of the respective processing areas;
ii) measuring a plurality of productivity indicators relating to the milking animal; and
iii) using a combination of the measurements obtained in step i) and the productivity indicators obtained in step ii) to determine at least one condition of the milking animal; and
iv) indicating the condition at the monitoring apparatus in real time.

In preferred embodiments of the present invention, the milking animal is a cow. However, it should be appreciated that the present invention could apply to other milking animals such as goats and sheep.

Reference to a condition of the milking animal is not intended to be limited to an ailment, although the condition may be an infection such as mastitis or laminitis. One skilled in the art should realise that the condition of the milking animal may be with respect to physiological or psychological health, nutritional status, or oestrus condition.

Reference to a temperature sensor should be understood to refer to any device suitable for measuring temperature, whether directly or indirectly, preferably in a non-invasive manner.

In a preferred embodiment of the present invention, each temperature sensor is a thermographic camera.

It should be appreciated that this is not intended to be limiting, and at least one of the temperature sensors could be a non-contact thermopile sensor configured to measure heat flux.

In one embodiment, the thermopile may be combined with another sensor such as a camera.

In a preferred embodiment, each sensor is configured to transmit measurements or data obtained to the processor.

The processor may be any suitable means known in the art configured to receive data and perform processes or calculations to determine the condition.

The steps of a method, process, or algorithm described in connection with the present invention may be embodied directly in hardware, in a software module executed by the processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the processes.

The processor may include one or more application specific integrated circuits (ASICs), digital signal processors (DSPs), digital signal processing devices (DSPDs), programmable logic devices or controllers (PLDs, PLCs), field programmable gate arrays (FPGAs), computers, lap tops, controllers, micro-controllers, microprocessors, electronic devices, other electronic units (whether analogue or digital) designed to perform the functions described herein, or a combination thereof.

Reference to a processing area should be understood to mean a particular area on an animal for which it is of interest to measure heat output.

For example, with relation to the detection of oestrus the processing areas may include the back, tail crest, pin bones as well as the external pudendum (extending beyond the gluteal region).

In particular, it is important to note that with animals which are not barn animals (such as those farmed in Australasia), it is more likely for the cows to exhibit riding behaviour. Thus, in some instances of the present invention the heat output detected may only be that associated with riding behaviour. This requires selection of the processing area in order to capture those areas of rubbing and lesions that occur as a consequence.

With barn animals (usually outside Australasia), riding behaviour is not as typical, and may require selection of the processing area such that the sexual organs and/or other areas having high heat output associated with oestrus are captured instead.

In preferred embodiments, the processing areas may also include:
pedal extremities for the detection of lameness,
at the udder for detection of mastitis, or
at the head (particularly the eyes) for the detection of Bovine Viral Disease (BVD), or in assessing stress of the animal, as described in "Early detection and prediction of infection using infrared thermography" (Schaefer et al, 2004).

It should be appreciated that these examples are not intended to be limiting.

In one embodiment of the present invention, the apparatus may include one temperature sensor associated with detection of each condition. For example, the apparatus may include one sensor directed to the eyes of an animal for detecting BVD, one to the side of the udder for detecting mastitis, and one to the pudendum for detecting oestrus.

Alternatively, the apparatus may include several sensors associated with the detection of a condition—for example, different angles of the udder for mastitis, or the sexual organs in conjunction with the back region for oestrus.

In one embodiment, at least one sensor may be configured to be directed to more than one processing area. For example, a camera mounted at the head of an animal may be configured to obtain an image of an eye of the animal, and then adjust its focus to the cheek of the animal. This may have advantages both in terms of reducing the number of sensors required, and also in reducing the variation in data which would otherwise exist between sensors.

In preferred embodiments of the present invention, the present invention is conducted within a milking system, in particular within the region of a milking stall.

Taking measurements within a milking shed is an important feature of the present invention. The milking shed offers conditions by which the animals are contained within a defined area as opposed to taking measurements out in the field.

By using the milking shed, and particularly a milking stall, sensors can be set up in a permanent or semi permanent position with one set of sensors being able to take readings from many cows as they enter the milking stall with which the sensors are associated. It may be that only a single set of sensors is used, the sensors being mounted with respect to a point that the animal passes while being milked or on its way to be milked—or as it exits the milking parlour.

It can be seen therefore that the choice of where to mount the sensors is very important and can provide considerable advantages when compared to having individual detection devices associated with each animal.

It is envisaged that the location of a temperature sensor may lend itself to purposes other than the measurement of temperature per se. For example, it is envisaged that a thermal camera directed to monitoring the udder may be utilised in locating the teats in order to guide an automatic milking machine to apply the teatcups. In doing so, the costs and complexity of the system may be reduced.

The present invention can be used with many different types of indicators of heat outputs from the processing area.

To limit the effects of non essential heat sources, one embodiment of the present invention applies a filter to the images received by the thermographic camera such that all heat sources below a particular temperature threshold are ignored.

The threshold can vary according to the particular environment.

Another method could be to obtain historical temperature readings of a cow and use as a subsequent threshold only those temperatures above the average of the cow when it is known not to be in a particular condition.

It may be that for less temperate climates that the best time to read the cows would be with the morning milking as there is less likelihood that the external surface of the cow would have been warmed through exposure to the sun—in comparison with afternoon milking. However, with the use of herd normalisation the effects of ambient conditions can be minimised thus allowing condition detection at any time.

Once the threshold has been applied, then a number of different methods could be used to assess the relevance of the images obtained.

For example, all pixels above the threshold used may be counted to give an absolute reading. Any number of counts above a certain amount may be an indicator of a condition.

For example, the amount may be a certain percentage above the "average" historical temperature of that cow not having the condition.

Alternatively, the count may be just an absolute number above which any cows considered to have the condition.

Alternatively, it has been recognised that oestrus is a condition which has a gradual onset over a period of several hours and is associated with increasing concentrations of oestrogen being secreted by the ovary up until the time of ovulation when oestrogen synthesis ceases. Thus, a sharp change from one day to the next in gradient between historical temperatures to the present temperature may be an oestrus indicator.

The jump between the oestrus state and the non-oestrus state is statistically large. Thus, a temperature sensor of the present invention for use in detecting oestrus can be a low resolution camera.

One of the many advantages of the present invention is that all of the calculations can be made before the cow exits the milking bail. Thus, the farmer can get feedback around the time of milking as to whether the cow has a condition, and treat the cow or milk accordingly.

In preferred embodiments of the present invention, herd normalisation may be used in order to give greater elimination of environmental effects. For example, each cow may be compared with the temperature of say 10 cows before and after in the milking/drafting process. Thus, the average herd temperature can be used as a base to compare individual cows against. Therefore a spike in temperature arising from a condition against the herd average would be more accurate than taking an absolute temperature which may be affected by environmental conditions—such as a hot day.

It is envisaged that although the use of temperature measurements in isolated cases are known, the increased range of data obtained from a plurality of sensors may improve the accuracy of determining a condition—providing a synergy not otherwise achievable.

For example, the processing areas may include both the right and left flanks in order to obtain a temperature differential measurement between the two areas. "Investigations on Biological Indicators for Feed Efficiency in Cattle" (Montanholi, 2009) has suggested that such a temperature differential may be highly related to the production of methane.

"Using Body Surface Temperature to Predict Calving" (Coppola et al, 2002) further suggests that a decrease in udder and side surface temperature may be used to predict calving.

Reference to a productivity indicator should be understood to mean a quantifiable measurement of factors directly or indirectly associated with performance of the animal, particularly with regard to milk production and quality. Examples of direct productivity indicators may include yield, fat content, protein content, feed efficiency, somatic cell count, or lactose. Alternatively, indirect indicators may be factors used to derive or determine these direct indicators—such as conductivity of the milk, or feeding patterns or feed quality.

It should be appreciated that many of these factors may be obtained by sensors known to a person skilled in the art. Such sensors may be referred to as productivity sensors within the present specification. Preferably sensors relating to the detection of indicators associated with milk and milk production are configured to operate in an on-line environment, while milk is being extracted from the animal.

In doing so, current data may be obtained and used to determine a condition of the animal while it is still in the stall. This facilitates efficient treatment or processing of the animal while it is in a known, and contained, location.

An example of an on-line somatic cell count sensor which may be used as a productivity sensor may be found in U.S. Pat. No. 7,234,414. As well as verifying the results of the temperature based algorithms, such a sensor may be used to calibrate the equipment to increase accuracy and/or reliability for future readings.

Montanholi (2009) has suggested that hoof temperature provides a strong indicator of heat production as it relates to feed efficiency. However, in isolation, hoof temperature measurement may provide an inaccurate assessment of feed efficiency—with conditions such as laminitis potentially affecting the temperature reading of an animal.

In fact, it is widely accepted that laminitis may be caused by rumen acidosis, which results either from a diet that contains too much starch or one that does not contain enough fiber. It may be that a cow is identified as having low feed efficiency based on hoof temperature when in fact the temperature reading is temporarily skewed by laminitis brought on by poorly monitored feeding patterns or deficiencies in the feed.

Further, hoof temperature may be indicative of other conditions such as foot and mouth disease, with increased temperature being observed up to two days prior to clinical signs developing.

The present invention would enable validation or verification of initial identification of a condition based on the temperature measurements, resulting in a more accurate diagnosis and thus more efficient treatment or rectification program.

Other examples of such combinations of data may include:
 hoof temperature together with temperature differential between flanks to evaluate feed efficiency, confirmed with milk yield;
 udder temperature in conjunction with milk yield and conductivity for the detection of mastitis; or
 pudendum temperature data together with milk yield and rumination data for detection of oestrus.

It should be appreciated that these are by way of example only, and are not intended to be limiting.

"Graphic monitoring of the course of some clinical conditions in dairy cows using a computerized dairy management system" (Moallem et al, 2002) describes a data management system in which visualisation of traditional metrics are used to detect potential illnesses, and subsequently monitor an animal and its treatment. It is envisaged that there may be particular advantages to implementing a similar visualisation of the temperature data and associated results obtained with the present invention.

It is envisaged that the present invention may reduce the likelihood of such a misdiagnosis by providing an overall picture of the wellbeing of an animal, allowing for correlations between various conditions to be made, or by identifying outlying individual conditions due to their variation from the general state of the animal.

In a preferred embodiment determining the condition includes accessing historical data associated with the animal for comparison with the received heat output and productivity indicator.

Preferably, the positioning of the apparatus is coupled (directly or indirectly) with an identification (ID) reader so that the temperature and productivity indicators being sensed are matched up with the cow's ID.

It should be appreciated that there are many systems available which record individual identities of cows (e.g. through ear tags) and assign to these various parameters being measured during, before or after a milking process. Therefore, the present invention can be used with any of these systems.

The value of building predictive models for individual animals which utilise multiple variables measured on an ongoing basis has been previously discussed. However, the present invention seeks to provide an advancement over previous systems by providing data of a range and nature not previously considered.

In preferred embodiments, historical data for each cow may be referenced during the processing. The majority of farm practices utilise a twice-a-day milking schedule, with some high producing farms milking up to three times. By obtaining temperature readings at each of these times, a comprehensive record of data may be established.

As such, in a preferred embodiment the processor is configured to update a historical record associated with the identification of the animal with the condition, heat output and productivity indicators.

An individual history may allow for more accurate predicative modelling of the conditions desired for detection. As with any organic entity, variations between individuals will lead to inaccuracies in models based on collective data.

However, it should be appreciated that in some instances determination of a condition may involve comparing data points or trends across a herd, or at least animals processed within a particular timeframe.

As such, in an embodiment of the present invention, determining the condition includes accessing historical data associated with a group of animals to which the animal belongs for combination or comparison with the received heat output and productivity indicator.

Preferably the present invention utilises a cow's individual ID to correlate the data gathered by the temperature sensors with historical records in a database. The individual histories may store a wide range of data—not restricted to temperature alone. Thus, the accuracy (sensitivity and specificity) of the determination of the animal's condition may be improved. For example, milk yield and/or rumination data over time may provide additional indicators of oestrus conditions.

Further, the historical records may include treatment or diagnosis history which is referenced during determination of the condition. For example, if an animal's history indicates that it is being treated for laminitis, a higher hoof temperature may be less significant when assessing feed efficiency.

As such, in a preferred embodiment the processor is configured to access historical data associated with the identification of the animal for comparison or combination with the received heat output and productivity indicator when determining the condition.

Processing of the data from the sensors may be conducted in a variety of means.

Preferably the data is processed in real time so that treatment or processing of the cow may occur while still in the vicinity of a milking shed or place of temperature sensing.

Therefore, in preferred embodiments, the processor may be included in the vicinity of the milking shed in order to activate control machinery or a treatment delivery device when a particular condition has been sensed.

However this should not be seen as limiting, as the data may be transmitted to an offsite processor whereby the data may be either processed instantly or after a delay.

In a preferred embodiment, the condition, or an indication of the condition, is presented in real time at the monitoring apparatus.

It should be appreciated that this may be achieved in a number of ways, such as display of text, colours, and/or symbols on a display device, activation of designated lights or a combination of lights, or any other suitable means known to a person skilled in the art.

Detection of a condition may activate an alarm alerting a farmer (or any other user) to the condition. The alarm may be visual or audible at the detection site, but more likely will be a remote notification via email or SMS message. Alternatively, the processor may record a number of cows to be treated, following which the farmer will arrange treatment/insemination for the plurality of animals.

In some embodiments of the present invention there may even be provided automatic drafting of the animals which are detected to have a condition. For example, animals may be separated from the rest of the herd for insemination by a technician.

The present invention has considerable advantages over the prior art.

Synergy of multiple temperature measurements with productivity data enables more accurate determination of various conditions.

Early and accurate detection leads to increased odds of conception in the case of oestrus detection, as well as early diagnosis, and therefore treatment, of a health condition of the animal. Further, more informed and therefore efficient decisions may be made regarding whether treatment is cost effective, or whether culling of the animal is preferred.

The present invention does not require a high degree of labour, particularly as the elimination of environmental conditions and the use of additional data means that automatic sensing can occur without the manual manipulations employed by some other techniques.

There are no environmental concerns as no disposable detection systems are used.

With rotary and robotic milking sheds, as well as in large feed lots that have a race leading to the milking parlour only one detection system is required per shed, making overall the cost of the present invention comparatively cheap on a per cow basis. With herringbone sheds cows usually have to enter/exit in single file so a single set of sensors could be placed appropriately.

The present invention also leads to the ability to automatically draft cows needing insemination and/or treatment.

Farmers tend to be more conservative in diagnosing oestrus in inseminated cows as distinct from cows yet to be inseminated. The presumption is that in the former case, the cow may be pregnant. To inseminate again when it is pregnant but not in oestrus can disrupt the pregnancy. Even if that does not occur, the straw of semen has been wasted.

An advantage with the present invention is that it represents a form of objective assessment independent of any human influence, and it can instantly recall previous history of relevance. For example, heat dates, insemination dates and/or previous treatment dates. Therefore, the use of the sensor can reduce the average interval from first insemination to conception in a herd by minimising the incidence of missed oestrus events that may occur after the first (or subsequent) insemination.

BRIEF DESCRIPTION OF DRAWINGS

Further aspects of the present invention will become apparent from the following description which is given by way of example only and with reference to the accompanying drawings in which.

DETAILED DESCRIPTION

Figure 1:
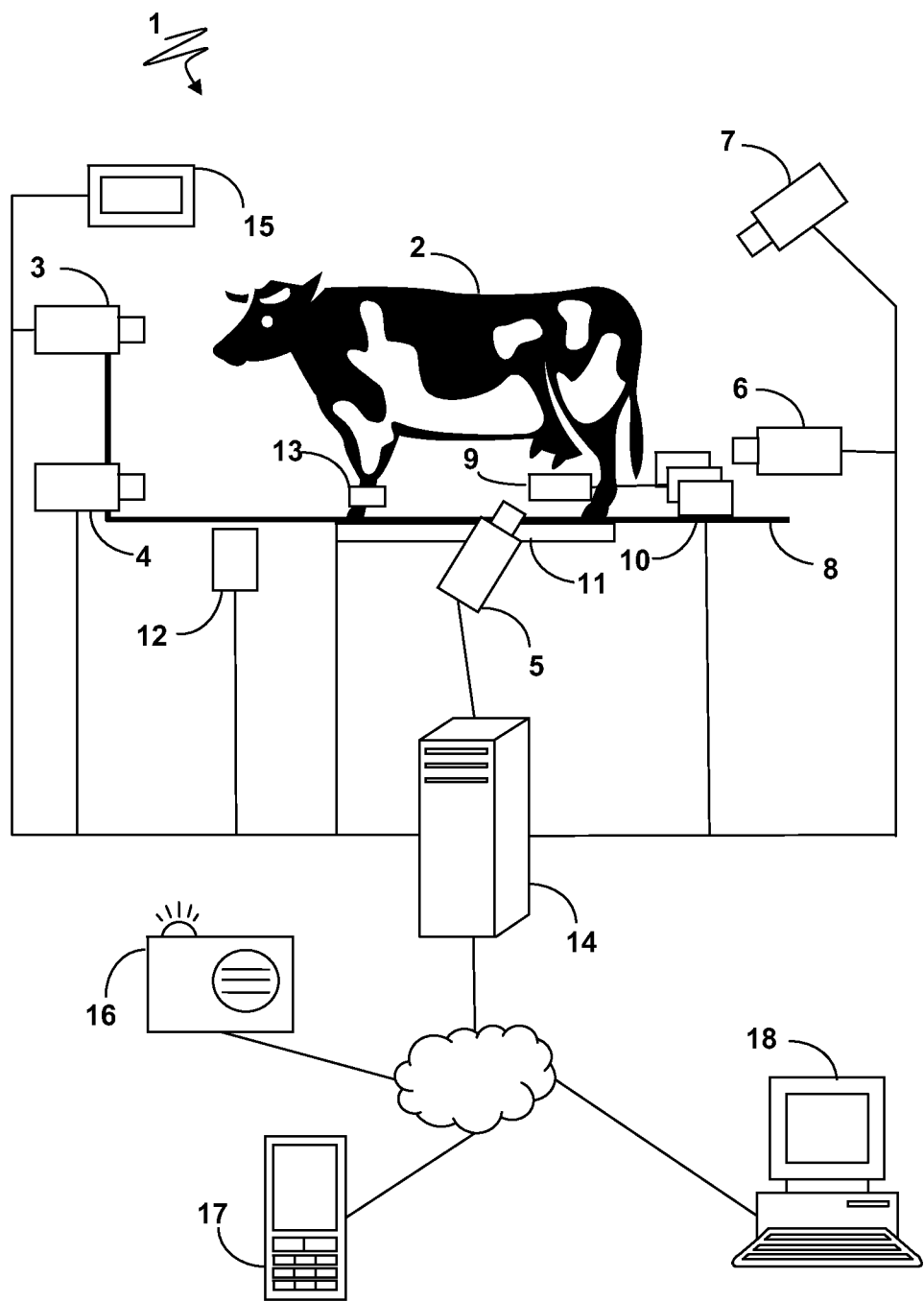
FIG. 1 is a schematic depicting one embodiment of the present invention.

FIG. 1 illustrates an apparatus (generally indicated by arrow 1) for monitoring a cow (2).

The apparatus (1) includes a plurality of thermographic cameras (3, 4, 5, 6, 7) mounted in a stall (8).

Each camera is configured to measure an indicator of heat output from different processing area of the cow (2).

For example, camera (3) is positioned to measure heat output from the eyes of the cow (2); camera (4) the hoofs; camera (5) a first angle of the cow's udder; camera (6) a second angle of the cow's udder; and camera (7) the cow's back/pudendum.

The stall (8) includes a milking apparatus (9) for extracting milk from the cow. Productivity sensors (10) such as a conductivity sensor, yield sensor, fat sensor, protein sensor, lactose sensor, conductivity sensor, or somatic cell count sensor are associated with the milking apparatus (9) to capture productivity indicators associated with the cow.

The apparatus (1) also includes a weigh station (11) to record the cow's weight as a productivity indicator.

An ID reader (12) also reads an identification tag (13) associated with the cow to identify it.

The apparatus (1) also includes a processor (14), configured to receive the cow's ID, heat output measurements from the cameras (3-7) and productivity indicators from the weigh station (11) and sensors (10), and use these to determine at least one condition of the cow (2) such as lameness, the onset of oestrus, mastitis or BVD.

The apparatus includes a display (15) associated with the stall (8), and an alarm in the form of a siren/strobe (16).

Figure 2:
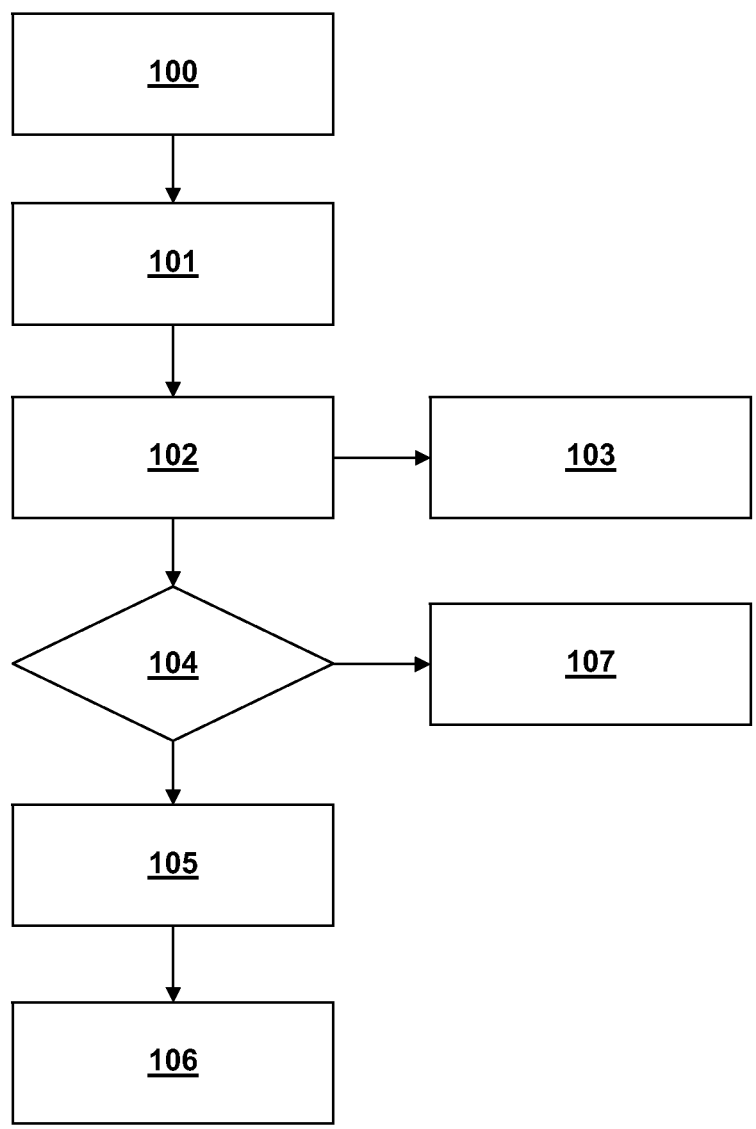
FIG. 2 is a flow diagram illustrating a method according to one aspect of the present invention.

FIG. 2 illustrates a method of monitoring a milking animal using the monitoring apparatus described with reference to FIG. 1.

In step 100, measuring, indicators of heat output and productivity indicators are measured.

At step 101, the indicators of heat output and productivity indicators are received by the processor (14).

In step 102, the processor (14) uses these to at least one condition of the cow (2).

Determination of the condition includes comparison of the measurements against predetermined thresholds, wherein particular combinations are indicative of a particular condition.

In doing so, the processor (14) accesses historical data associated with the cow. The current measurements are compared with historical data, for example a rolling average of that particular measurement, to determine the extent of deviation for that animal. The thresholds utilised by the diagnostic algorithms may therefore not be a hard level, but relative to that particular animal.

Similarly, the processor (14) may access historical data associated with the herd to which the cow belongs to assess whether any changes in the measurements are consistent across the herd—potentially indicating changes in environmental factors or equipment being the source of any variation in the current measurements.

On determination of the condition(s), if any, the processor (14) is configured to update the historical record in step 103.

If a condition has been determined, in step 104 an indication of the condition(s) is displayed in real time on the display (15) associated with the stall (8).

The processor (14) is also configured to issue an alarm in step 105.

The alarm may be in the form of the siren/strobe (16), but may also be a remote notification via email or SMS message to a hand-held device (17) or personal computer (18).

In step 106 the processor (14) is also configured to control an automatic drafting system to direct the cow to a desired location—depending on the condition of the cow. In addition, or alternatively, the processor (14) may control a treatment device to deliver treatment to the cow in response to determination of the condition.

If no condition is determined at step 102, the cow will be permitted to complete milking as normal, and be released at step 107.

Figure 3:
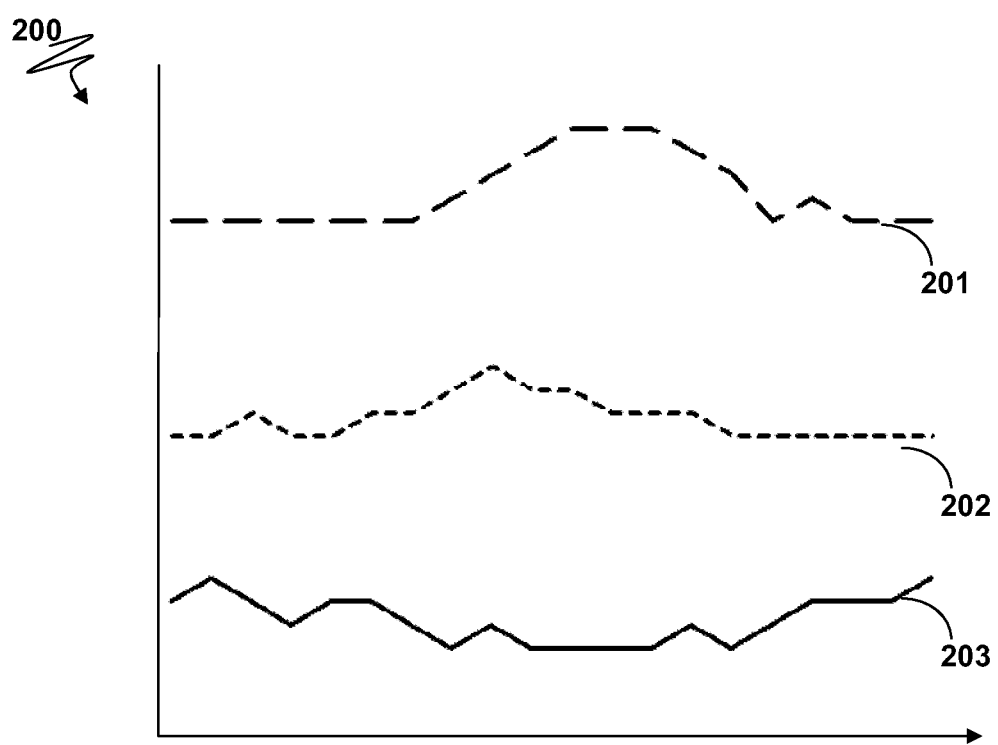
FIG. 3 illustrates a visualisation of data according to one embodiment of the present invention.

FIG. 3 illustrates a possible visualisation (200) of data in accordance with one embodiment of the present invention.

The visualisation (200) includes three trend lines—electrical conductivity (201), udder temperature (202) and yield (203)—over time for data obtained for an individual animal.

By comparison of the trend lines, it may be seen that udder temperature (202) increases, coupled with an eventual increase in electrical conductivity (201) and decrease in milk yield (203).

An observer can correlate these trends and determine that the particular animal may be suffering from a particular condition, in this case potentially mastitis, and ascribe a treatment program for the animal.

Aspects of the present invention have been described by way of example only and it should be appreciated that modifications and additions may be made thereto without departing from the scope thereof as defined in the appended claims.

I claim:

1. An apparatus for monitoring a milking animal during milking of the animal, comprising:
   - a plurality of productivity sensors, each configured to measure at least one indicator of productivity of the animal and output a signal indicative of same;
   - a plurality of temperature sensors, each sensor configured to measure an indicator of heat output from different processing areas of the milking animal and output a signal indicative of same, wherein at least two of the temperature sensors are thermographic cameras; and
   - a processor configured to:
     - receive the signals indicative of heat output;
     - receive the signals indicative of the productivity indicators, and
     - use a combination of the heat output and productivity indicators to determine at least one condition of the milking animal, and cause that condition to be indicated in real time at the monitoring apparatus.

2. The apparatus of claim 1, wherein the at least two thermographic cameras comprise a thermographic camera directed towards the eyes of the animal, and a thermographic camera directed to the rear end of the animal.

3. The apparatus of claim 1, comprising an ID reader configured to read an identification tag associated with the animal.

4. The apparatus of claim 3, wherein the processor is configured to update a historical record associated with the identification of the animal with the condition, heat output and productivity indicators.

5. The apparatus of claim 3, wherein the processor is configured to access historical data associated with the identification of the animal for comparison or combination with the received heat output and productivity indicator when determining the condition.

6. The apparatus of claim 1, wherein the processor is configured to access historical data associated with a group of animals to which the animal belongs for comparison or combination with the received heat output and productivity indicator when determining the condition.

7. The apparatus of claim 1, wherein the productivity sensors comprise at least one of a conductivity sensor, yield sensor, fat sensor, protein sensor, lactose sensor, or somatic cell count sensor.

8. The apparatus of claim 1, comprising an alarm configured to alert a user to the condition.

9. The apparatus of claim 1, wherein the processor is configured to control an automatic drafting system according to the determined condition.

10. A method of monitoring a milking animal, using a monitoring apparatus, during milking of the animal, the method comprising the steps of:
    i) measuring, with each sensor of a plurality of temperature sensors positioned relative to the milking animal such that each sensor is directed to a different processing area, an indicator of heat output from each respective processing area, wherein at least two of the temperature sensors are thermographic cameras, each configured to obtain a thermographic image of the respective processing areas;
    ii) measuring a plurality of productivity indicators relating to the milking animal; and
    iii) using a combination of the measurements obtained in step i) and the productivity indicators obtained in step ii) to determine at least one condition of the milking animal; and
    iv) indicating the condition at the monitoring apparatus in real time.

11. The method of claim 10, wherein a thermographic camera is directed towards the eyes of the animal, and a thermographic camera is directed towards the rear end of the animal.

12. The method of claim 10, comprising the step of identifying the animal with an ID reader configured to read an identification tag associated with the animal.

13. The apparatus of claim 12, comprising the step of updating a historical record associated with the identification of the animal with the condition, heat output and productivity indicators.

14. The method of claim 12, wherein determining the condition comprises accessing historical data associated with the identification of the animal for comparison or combination with the received heat output and productivity indicator.

15. The method of claim 10, wherein determining the condition comprises accessing historical data associated with a group of animals to which the animal belongs for comparison or combination with the received heat output and productivity indicator.

16. The method of claim 10, wherein the productivity indicators comprise at least one of milk conductivity, milk yield, milk fat content, milk lactose content, somatic cell count, or feed efficiency.

17. The method of claim 10, comprising the step of issuing an alarm configured to alert a user to the condition.

18. The method of claim 10, comprising the step of controlling an automatic drafting system in response to the determined condition.

* * * * *